(12) United States Patent
Li et al.

(10) Patent No.: US 12,495,360 B2
(45) Date of Patent: Dec. 9, 2025

(54) PACKET SCHEDULING METHOD AND APPARATUS, USER EQUIPMENT, AND STORAGE MEDIUM

(71) Applicant: Beijing Xiaomi Mobile Software Co., Ltd., Beijing (CN)

(72) Inventors: Yanhua Li, Beijing (CN); Xiaowei Jiang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 310 days.

(21) Appl. No.: 18/003,292

(22) PCT Filed: Jun. 28, 2020

(86) PCT No.: PCT/CN2020/098641
§ 371 (c)(1),
(2) Date: Dec. 23, 2022

(87) PCT Pub. No.: WO2022/000148
PCT Pub. Date: Jan. 6, 2022

(65) Prior Publication Data
US 2023/0247552 A1 Aug. 3, 2023

(51) Int. Cl.
*H04W 76/28* (2018.01)
*H04W 52/02* (2009.01)
*H04W 72/23* (2023.01)
*H04W 74/04* (2009.01)

(52) U.S. Cl.
CPC ....... *H04W 52/0229* (2013.01); *H04W 72/23* (2023.01); *H04W 74/04* (2013.01); *H04W 76/28* (2018.02)

(58) Field of Classification Search
CPC . H04W 52/0229; H04W 72/23; H04W 74/04; H04W 76/28; H04W 76/15; H04W 52/0216; H04W 52/0209; Y02D 30/70
See application file for complete search history.

(56) References Cited

U.S. PATENT DOCUMENTS

RE50,037 E * 7/2024 Kim .................. H04W 56/0045
2018/0343673 A1 11/2018 Chen et al.
2019/0116585 A1 4/2019 Chakraborty et al.
(Continued)

FOREIGN PATENT DOCUMENTS

CN 104412524 A 3/2015
CN 105142238 A 12/2015
(Continued)

OTHER PUBLICATIONS

"Other issues for UE power saving," Proceedings of the 3GPP TSG RAN WG1 #100 Meeting, Vivo, R1-2000340, Feb. 24, 2020, e-Meeting, 4 pages.
(Continued)

*Primary Examiner* — Thomas R Cairns
*Assistant Examiner* — Raenita Ann Fenner
(74) *Attorney, Agent, or Firm* — McCoy Russell LLP

(57) ABSTRACT

A packet scheduling method includes: receiving, by user equipment, first indication information sent by a network device, wherein the first indication information is configured to indicate a discontinuous reception (DRX) packet which needs to be woken up by the user equipment due to trigger of data transmission.

20 Claims, 3 Drawing Sheets

(56) References Cited

U.S. PATENT DOCUMENTS

| | | | |
|---|---|---|---|
| 2020/0037367 A1 | 1/2020 | Kim et al. | |
| 2020/0045768 A1 | 2/2020 | He et al. | |
| 2020/0092814 A1 | 3/2020 | Zhou et al. | |
| 2020/0205076 A1 | 6/2020 | Chen et al. | |
| 2022/0039009 A1* | 2/2022 | Iyer | H04L 5/0098 |
| 2022/0110184 A1* | 4/2022 | Jeon | H04W 74/0833 |
| 2022/0312325 A1* | 9/2022 | Turtinen | H04W 76/28 |

FOREIGN PATENT DOCUMENTS

| | | |
|---|---|---|
| CN | 107040351 A | 8/2017 |
| CN | 109155973 A | 1/2019 |
| CN | 110351875 A | 10/2019 |
| CN | 110520840 A | 11/2019 |
| CN | 110945921 A | 3/2020 |
| IN | 201814012362 A | 11/2018 |
| KR | 20150051091 A | 5/2015 |
| WO | 2017177818 A1 | 10/2017 |
| WO | 2017208768 A1 | 12/2017 |
| WO | 2018161244 A1 | 9/2018 |

OTHER PUBLICATIONS

"Remaining details of PDCCH-based power saving signal/channel," Proceedings of the 3GPP TSG-RAN WG1 #100 Meeting, Intel Corporation, R1-2000742, Feb. 24, 2020, e-Meeting, 5 pages.

"Discussion on 2nd DRX group," Proceedings of the 3GPP TSG-RAN WG1 Meeting #100bis, Vivo, R1-2001693, Apr. 20, 2020, e-Meeting, 3 pages.

"RAN1 impact analysis due to the introduction of secondary DRX cycle," Proceedings of the 3GPP TSG RAN WG1 Meeting #100bis-e, Huawei, HiSilicon, R1-2002578, Apr. 20, 2020, E-meeting, 8 pages.

"MAC design to support intra-NR CA," Proceedings of the 3GPP TSG-RAN WG2 Meeting #98, Huawei, HiSilicon, R2-1704606, May 15, 2017, Hangzhou, China, 3 pages.

"Further considerations on secondary DRX group," Proceedings of the 3GPP TSG-RAN WG2 Meeting #109 electronic, OPPO, R2-2004553 Revision of R2-2002836, Jun. 1, 2020, E-Meeting, 6 pages.

"Views on introduction of Dual DRX," Proceedings of the Proceedings of the 3GPP TSG-RAN WG2 Meeting #110-e, Xiaomi Communications, R2-2004786, Jun. 1, 2020, E-Meeting, 3 pages.

* cited by examiner

PACKET SCHEDULING METHOD AND APPARATUS, USER EQUIPMENT, AND STORAGE MEDIUM

CROSS REFERENCE TO RELATED APPLICATIONS

The present application is a U.S. National Phase of International Application No. PCT/CN2020/098641 entitled "PACKET SCHEDULING METHOD AND APPARATUS, USER EQUIPMENT, AND STORAGE MEDIUM," and filed on Jun. 28, 2020. The entire contents of each of the above-listed applications are hereby incorporated by reference for all purposes.

BACKGROUND

Release 10 (R10) of long term evolution (LTE) introduces characteristics of carrier aggregation (CA). It may be divided into continuous carrier aggregation and discontinuous carrier aggregation. For the continuous carrier aggregation, a terminal only needs one transceiver to realize multi-carrier communication. For different bands of the discontinuous carrier aggregation, different radio frequency (RF) chains are needed.

SUMMARY

According to a first aspect of an example of the disclosure, a packet scheduling method is provided, and includes:
 receiving, by user equipment, first indication information sent by a network device, where the first indication information is configured to indicate a DRX packet which needs to be woken up by the user equipment due to trigger of data transmission.

According to a second aspect of an example of the disclosure, a packet scheduling method is provided, and includes:
 sending, by a network device, first indication information to user equipment, where the first indication information is configured to indicate a DRX packet which needs to be woken up by the user equipment due to trigger of data transmission.

According to a third aspect of an example of the disclosure, a user equipment is provided, and includes a processor, a transceiver, a memory and an executable program stored on the memory and capable of being executed by the processor, where the processor, when running the executable program, executes steps of the packet scheduling method according to the first aspect of an example of the disclosure.

According to a fourth aspect of an example of the disclosure, a network device is provided, and includes a processor, a transceiver, a memory and an executable program stored on the memory and capable of being executed by the processor, where the processor, when running the executable program, executes steps of the packet scheduling method according to the second aspect of an example of the disclosure.

It is to be understood that the above general descriptions and later detailed descriptions are examples and illustrative, and cannot limit the examples of the disclosure.

BRIEF DESCRIPTION OF THE DRAWINGS

The accompanying drawings here are incorporated into the specification and constitute a part of the specification, showing the principles consistent with the examples of the disclosure and used together with the specification to explain the examples of the disclosure.

DETAILED DESCRIPTION

Examples will be described in detail here, and instances are shown in the accompanying drawings. When the following description refers to the accompanying drawings, unless otherwise indicated, the same numbers in different accompanying drawings indicate the same or similar elements. The implementations described in the following examples do not represent all implementations consistent with the examples of the disclosure. Rather, they are merely instances of apparatuses and methods consistent with some aspects of the examples of the disclosure as detailed in the appended claims.

The terms used in the examples of the disclosure are merely for the purpose of describing specific examples, and not intended to limit the examples of the disclosure. The singular forms "one", "said" and "the" used in the examples of the disclosure and the appended claims are also intended to include the multiple forms unless the context clearly indicates other meanings. It needs also to be understood that the term "and/or" used here refers to and includes any or all possible combinations of one or more associated listed items.

It needs to be understood that although the terms first, second, third, etc. may be used to describe various information in the examples of the disclosure, such information should not be limited to these terms. These terms are merely used to distinguish the same type of information from each other. For instance, without departing from the scope of the examples of the disclosure, first information may also be referred to as second information, and similarly, the second information may also be referred to as the first information. Depending on the context, the word "if" as used here can be interpreted as "at the time" or "when" or "in response to determining".

Figure 1:
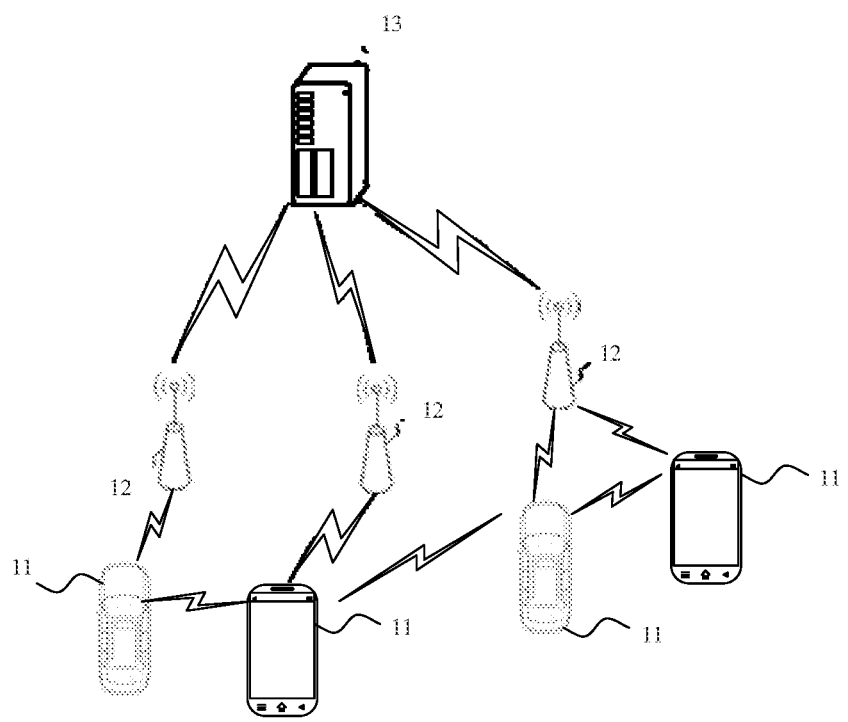
FIG. 1 is a schematic structural diagram of a wireless communication system illustrated according to an example.

Please refer to FIG. 1, which illustrates a schematic structural diagram of a wireless communication system provided by an example of the disclosure. As shown in FIG. 1, the wireless communication system is a communication system based on a cellular mobile communication technology. The wireless communication system may include: a plurality of terminals 11 and a plurality of base stations 12.

The terminals 11 may refer to devices that provide a user with voice and/or data connectivity. The terminals 11 may communicate with one or more core networks via a radio access network (RAN). The terminals 11 may be Internet of Things terminals, such as sensor devices, mobile phones (or called "cellular" phones) and computers with Internet of Things terminals. For instance, the terminals may be fixed, portable, pocket-size, handheld, computer built-in or vehicle-mounted apparatuses. For instance, the terminal may be a station (STA), a subscriber unit, a subscriber station, a mobile station, a mobile, a remote station, an access point, a remote terminal, an access terminal, a user terminal, a user agent, a user device or user equipment (UE). Or, the terminals 11 may also be unmanned aircraft devices. Or, the terminals 11 may also be vehicle-mounted devices, such as a trip computer with a wireless communication function, or a wireless communication device connected with an external trip computer. Or, the terminals 11 may also be roadside devices, such as a street lamp, a signal light or other roadside devices with wireless communication functions.

The base stations 12 may be network side devices in the wireless communication system. The wireless communication system may be the 4th generation mobile communication (4G) system, also known as a long term evolution (LTE) system; or the wireless communication system may also be a 5G system, also known as a new radio (NR) system or a 5G NR system. Or, the wireless communication system may also be a next-generation system of the 5G system. An access network in the 5G system may be called a new generation-radio access network (NG-RAN). Or the wireless communication system may be an MTC system.

The base stations 12 may be evolved base stations (eNB) adopted in the 4G system. Or, the base stations 12 may also be base stations (gNB) adopting centralized and distributed architectures in the 5G system. When the base stations 12 adopt the centralized and distributed architectures, they typically include a central unit (CU) and at least two distributed units (DU). Protocol stacks of a packet data convergence protocol (PDCP) layer, a radio link control (RLC) layer and a media access control (MAC) layer are disposed in the central unit; and protocol stacks of physical (PHY) layers are disposed in the distributed units, and specific implementations of the base stations 12 are not limited in the example of the disclosure.

The base stations 12 and the terminals 11 may establish wireless connection through a wireless radio. In different implementations, the wireless radio is a wireless radio based on the 4G standard; or, the wireless radio is a wireless radio based on the 5G standard, such as a new radio; or, the wireless radio may also be a wireless radio based on the next-generation mobile communication standard of 5G.

In some examples, the terminals 11 may also establish end to end (E2E) connection. For instance, vehicle to vehicle (V2V) communication, vehicle to infrastructure (V2I) communication and vehicle to pedestrian (V2P) communication in vehicle to everything (V2X) communication and other scenarios.

In some examples, the above wireless communication system may further include a network management device 13.

The plurality of base stations 12 are connected with the network management device 13. The network management device 13 may be a core network device in the wireless communication system, for instance, the network management device 13 may be a mobility management entity (MME) in an evolved packet core (EPC). Or, the network management device may also be other core network devices, such as a serving gateway (SGW), a public data network gateway (PGW), a policy and charging rules function (PCRF) or a home subscriber server (HSS). The implementation form of the network management device 13 is not limited in the example of the disclosure.

Examples of the disclosure relate to a packet scheduling technology, in particular to a packet scheduling method and apparatus, user equipment, and a storage medium.

An execution entity involved in the example of the disclosure includes, but not limited to user equipment (UE) in a cellular mobile communication system, a base station for cellular mobile communication and the like.

R10 of long term evolution (LTE) introduces characteristics of carrier aggregation (CA). It may be divided into continuous carrier aggregation and discontinuous carrier aggregation. For the continuous carrier aggregation, a terminal only needs one transceiver to realize multi-carrier communication. For different bands of the discontinuous carrier aggregation, different radio frequency (RF) chains are needed. It is very likely that a primary cell (PCell) and a secondary cell (SCell) use different RF chains. In this way, the RF chains used by the PCell and the SCell may be controlled respectively, and different discontinuous reception (DRX) packets may be provided with the PCell and the SCell. A CA scenario is different from an original DRX mechanism, that is, an auxiliary DRX packet for the SCell is newly introduced. At present, there is no DRX packet scheduling technical solution for the CA scenario for reference.

Figure 2:
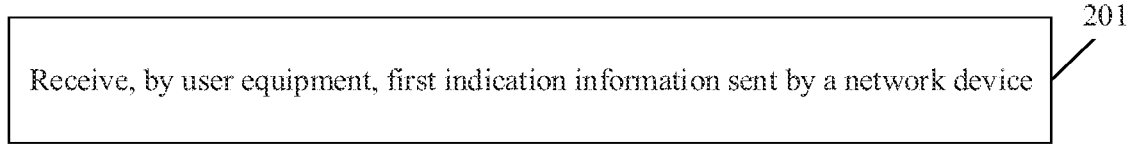
FIG. 2 is a schematic flow diagram of a packet scheduling method illustrated according to an example.

FIG. 2 is a schematic flow diagram of a packet scheduling method illustrated according to an example, as shown in FIG. 2, the packet scheduling method of the example of the disclosure includes:

step 201, user equipment receives first indication information sent by a network device, where the first indication information is configured to indicate a DRX packet which needs to be woken up by the user equipment due to trigger of data transmission.

In the example of the disclosure, the DRX packet which needs to be woken up by the user equipment due to the trigger of the data transmission includes: a DRX packet which needs to be woken up by the user equipment due to the trigger of the data transmission after receiving a contention-free RAR message.

In the example of the disclosure, it is supported that when the user equipment initiates a random access request of a PCell, the DRX packet includes a DRX packet where the PCell is located; it is also supported that when the user equipment initiates the random access request of the PCell, the DRX packet includes a DRX packet where an SCell is located; or when the user equipment initiates the random access request of the primary cell (PCell), the DRX packet includes the DRX packet where the PCell is located and the DRX packet where the SCell is located. That is, when the user equipment with a DRX function is in a DRX scenario, after the user equipment initiates the random access request through the PCell, it may wake up the DRX packet where the PCell is located, or the DRX packet where the SCell is located, or the DRX packet where the PCell is located and the DRX packet where the SCell is located when the user equipment needs to perform data transmission after receiving the contention-free RAR message.

In the example of the disclosure, when the user equipment initiates a random access request of an SCell, the DRX packet includes a DRX packet where a PCell is located; or, the DRX packet includes a DRX packet where the secondary cell (SCell) is located; or the DRX packet includes the DRX packet where the PCell is located and the DRX packet where the SCell is located. That is, when the user equipment with a DRX function is in a DRX scenario, after the user equipment initiates the random access request through the SCell, it may wake up the DRX packet where the PCell is located, or the DRX packet where the SCell is located, or the DRX packet where the PCell is located and the DRX packet where the SCell is located when the user equipment needs to perform data transmission after receiving the contention-free RAR message.

In one example of the disclosure, when the user equipment initiates the random access request of the primary cell (PCell), the DRX packet where the SCell is located needs to be woken up, or the DRX packet where the PCell is located and the DRX packet where the SCell is located need to be woken up, the user equipment needs to support a cross carrier scheduling function. If the user equipment does not enable the cross carrier scheduling function, it is further needed to inform the UE to enable the cross carrier scheduling function. Cross carrier scheduling information may be configured for the UE in advance, and meanwhile, the network device may further carry a configuration enabling the cross carrier scheduling function in a message informing the UE for contention-free random access (CI-RA) of indication of a DRX packet wake-up; or the message informing the UE for CFRA of the indication of the DRX packet wake-up may further carry the cross carrier scheduling information of the UE. Here, the cross carrier scheduling information of the UE includes carrier frequency information of cross carrier scheduling, identification information of a to-be-scheduled carrier frequency and the like.

In the example of the disclosure, receiving, by the user equipment, the first indication information sent by the network device includes: the user equipment receives a radio resource control (RRC) signaling, or an MAC control element or a downlink control information (DCI) message sent by the network device, where the RRC signaling, or the MAC control element, or the DCI message carries the first indication information.

As a means of implementation, the user equipment receives the RRC signaling by means of monitoring a broadcast channel or a dedicated control channel of the network device.

In the example of the disclosure, the MAC control element carrying the first indication information, may further include: it is indicated that the DRX packet where the PCell is located is woken up, or the DRX packet where the SCell is located is woken up, or the DRX packet where the PCell is located and the DRX packet where the SCell is located are both woken up by a newly added bit in the MAC control element. For instance, 1 bit or 2 bits are newly added in the MAC control element to specifically indicate the DRX packet to be woken up. Without considering a resource cost, more bits may also be set to indicate the DRX packet to be woken up. As a means of implementation, the MAC control element includes an RAR message.

In the example of the disclosure, the DCI message carrying the first indication information, includes: it is indicated that the DRX packet where the PCell is located is woken up, or the DRX packet where the SCell is located is woken up, or the DRX packet where the PCell is located and the DRX packet where the SCell is located are both woken up by a newly added bit in the DCI message. For instance, 1 bit or 2 bits are newly added in the DCI message to specifically indicate the DRX packet to be woken up. Without considering a resource cost, more bits may also be set to indicate the DRX packet to be woken up. As a means of implementation, the DCI message includes an msg0 message for random access by the user equipment.

In the example of the disclosure, the RRC signaling, or the MAC control element, or the DCI message further carries second indication information, and the second indication information is configured to indicate the user equipment to enable a cross carrier scheduling function. That is, the network device may carry information indicating the user equipment to enable cross carrier scheduling in the RRC signaling, or the MAC control element or the DCI message. Here, after the UE receives the information indicating the user equipment to enable cross carrier scheduling, and in response to determining that the cross carrier scheduling function is supported, the cross carrier scheduling function is enabled. The second indication information may further include carrier frequency information or carrier frequency identification information related to cross carrier scheduling, and the UE may perform corresponding cross carrier scheduling based on the carrier frequency information or the carrier frequency identification information.

In the example of the disclosure, when the UE initiates a random access request of an SCell, and the UE does not receive indication information of a DRX packet to be woken up in a downlink control message, the method includes: the DRX packet where the PCell is located is woken up by default in response to determining that an RAR message does not carry an indication of DRX packet wake-up, and the user equipment supports and configures with cross carrier scheduling. Or, the RAR message does not carry the indication of DRX packet wake-up, and the user equipment does not support or configure with cross carrier scheduling, and the DRX packet where the SCell is located is woken up by default.

According to the technical solution of the example of the disclosure, when the user equipment wakes up a DRX packet which needs to be woken up due to trigger of data transmission after receiving the contention-free RAR message, the user equipment does not wake up the PCell and the SCell indiscriminately, but wakes up only one of the PCell and the SCell or both the PCell and the SCell according to a current data transmission situation. In this way, for the user equipment, there is no need to enable all transceiver antennas in response to a wake-up instruction; and for a DRX packet to be woken up, only a transceiver antenna corresponding to the DRX packet to be woken up is enabled, such that the user equipment is more power-saving in a DRX mode.

Figure 3:
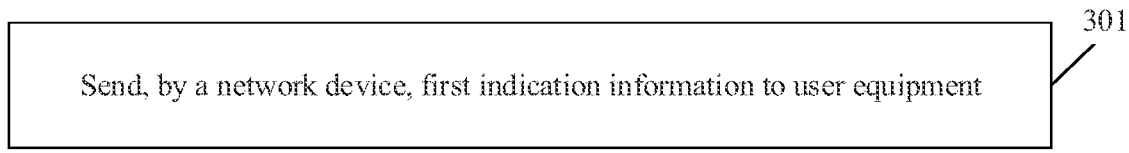
FIG. 3 is a schematic flow diagram of a packet scheduling method illustrated according to an example.

FIG. 3 is a schematic flow diagram of a packet scheduling method illustrated according to an example, as shown in FIG. 3, the packet scheduling method of the example of the disclosure includes:

step 301, a network device sends first indication information to user equipment.

The first indication information is configured to indicate a DRX packet which needs to be woken up by the user equipment due to trigger of data transmission. The DRX packet which needs to be woken up by the user equipment due to the trigger of the data transmission includes: a DRX packet which needs to be woken up by the user equipment due to trigger of data transmission after receiving a contention-free RAR message.

In the example of the disclosure, it is supported that when the user equipment initiates a random access request of a PCell, the DRX packet includes a DRX packet where the PCell is located; it is also supported that when the user equipment initiates the random access request of the PCell, the DRX packet includes a DRX packet where an SCell is located; or when the user equipment initiates the random access request of the primary cell (PCell), the DRX packet includes the DRX packet where the PCell is located and the DRX packet where the SCell is located. That is, when the user equipment with a DRX function is in a DRX scenario, after the user equipment initiates the random access request through the PCell, it may wake up the DRX packet where the PCell is located, or the DRX packet where the SCell is located, or the DRX packet where the PCell is located and the DRX packet where the SCell is located when the user equipment needs to perform data transmission after receiving the contention-free RAR message.

In the example of the disclosure, when the user equipment initiates a random access request of an SCell, the DRX packet includes a DRX packet where a PCell is located; or, the DRX packet includes a DRX packet where the secondary cell (SCell) is located; or the DRX packet includes the DRX packet where the PCell is located and the DRX packet where the SCell is located. That is, when the user equipment with a DRX function is in a DRX scenario, after the user equipment initiates the random access request through the SCell, it may wake up the DRX packet where the PCell is located, or the DRX packet where the SCell is located, or the DRX packet where the PCell is located and the DRX packet where the SCell is located when the user equipment needs to perform data transmission after receiving the contention-free RAR message.

In the example of the disclosure, sending, by the network device, the first indication information to the user equipment include: the network device sends the first indication information to the user equipment through an RRC signaling, or an MAC control element or a downlink control information (DCI) message.

The network device sends the RRC signaling to the user equipment through a broadcast channel or a dedicated control channel.

As an implementation, in the example of the disclosure, sending, by the network device, the first indication information to the user equipment through the MAC control element includes: it is indicated that the DRX packet where the PCell is located is woken up, or the DRX packet where the SCell is located is woken up, or the DRX packet where the PCell is located and the DRX packet where the SCell is located are both woken up by a newly added bit in the MAC control element. The MAC control element includes an RAR message.

As an implementation, in the example of the disclosure, sending, by the network device, the first indication information to the user equipment through the DCI message includes: it is indicated that the DRX packet where the PCell is located is woken up, or the DRX packet where the SCell is located is woken up, or the DRX packet where the PCell is located and the DRX packet where the SCell is located are both woken up by a newly added bit in the DCI message. For instance, 1 bit or 2 bits are newly added in the DCI message to specifically indicate the DRX packet to be woken up. Without considering a resource cost, more bits may also be set to indicate the DRX packet to be woken up. The DCI message includes an msg0 message for random access by the user equipment.

In the example of the disclosure, the method further includes: the network device sends second indication information to the user equipment through the RRC signaling, or the MAC control element or the DCI message, and the second indication information is configured to indicate the user equipment to enable a cross carrier scheduling function. That is, the network device may carry information indicating the user equipment to enable cross carrier scheduling in the RRC signaling, or the MAC control element or the DCI message. Here, after the UE receives the second indication information, if the cross carrier scheduling function is supported, the cross carrier scheduling function is enabled. The second indication information further includes carrier frequency information or carrier frequency identification information related to cross carrier scheduling, and the UE may perform corresponding cross carrier scheduling based on the carrier frequency information or the carrier frequency identification information.

According to the technical solution of the example of the disclosure, when the user equipment wakes up a DRX packet which needs to be woken up due to trigger of data transmission after receiving the contention-free RAR message, the user equipment does not wake up the PCell and the SCell indiscriminately, but wakes up only one of the PCell and the SCell or both the PCell and the SCell according to a current data transmission situation. In this way, for the user equipment, there is no need to enable all transceiver antennas in response to a wake-up instruction; and for a DRX packet to be woken up, only a transceiver antenna corresponding to the DRX packet to be woken up is enabled, such that the user equipment is more power-saving in a DRX mode.

Figure 4:
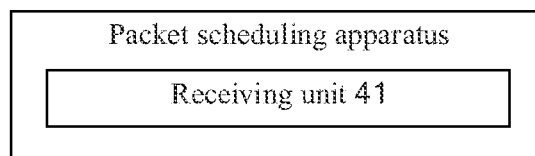
FIG. 4 is a schematic diagram of a composition structure of a packet scheduling apparatus illustrated according to an example.

FIG. 4 is a schematic diagram of a composition structure of a packet scheduling apparatus illustrated according to an example, as shown in FIG. 4, the packet scheduling apparatus of the example of the disclosure is applied to user equipment, and includes:

a receiving unit 41, configured to receive first indication information sent by a network device, where the first indication information is configured to indicate a DRX packet which needs to be woken up by the user equipment due to trigger of data transmission.

In one example, the DRX packet which needs to be woken up by the user equipment due to trigger of data transmission includes: a DRX packet which needs to be woken up by the user equipment due to the trigger of the data transmission after receiving a contention-free random access response (RAR) message.

In one example, when the user equipment initiates a random access request of a primary cell (PCell), the DRX packet includes a DRX packet where the PCell is located.

In one example, when the user equipment initiates a random access request of a primary cell (PCell), the DRX packet includes a DRX packet where a secondary cell (SCell) is located.

In one example, when the user equipment initiates a random access request of a primary cell (PCell), the DRX packet includes a DRX packet where the PCell is located, and a DRX packet where an SCell is located.

In one example, when the user equipment initiates a random access request of an SCell, the DRX packet includes a DRX packet where the PCell is located.

In one example, when the user equipment initiates a random access request of an SCell, the DRX packet includes a DRX packet where the secondary cell (SCell) is located.

In one example, when the user equipment initiates a random access request of an SCell, the DRX packet includes a DRX packet where the PCell is located, and a DRX packet where the SCell is located.

In one example, the receiving unit 41 is further configured to receive an RRC signaling, or an MAC control element or a downlink control information (DCI) message sent by the network device, and the RRC signaling, or the MAC control element, or the DCI message carries the first indication information.

In one example, the receiving unit 41 is further configured to receive the RRC signaling by means of monitoring a broadcast channel or a dedicated control channel of the network device.

In one example, the MAC control element carrying the first indication information, includes:

it is indicated that the DRX packet where the PCell is located is woken up, or the DRX packet where the SCell is located is woken up, or the DRX packet where the PCell is located and the DRX packet where the SCell is located are both woken up by a newly added bit in the MAC control element.

In one example, the MAC control element includes an RAR message.

In one example, the DCI message carrying the first indication information, includes:

it is indicated that the DRX packet where the PCell is located is woken up, or the DRX packet where the SCell is located is woken up, or the DRX packet where the PCell is located and the DRX packet where the SCell is located are both woken up by a newly added bit in the DCI message.

In one example, the DCI message includes an msg0 message for randomly access by the user equipment.

In one example, the RRC signaling, or the MAC control element, or the DCI message further carries second indication information, and the second indication information is configured to indicate the user equipment to enable a cross carrier scheduling function.

Based on the packet scheduling apparatus shown in FIG. 4, the packet scheduling apparatus recited in the example of the disclosure further includes:

a wake-up unit (not shown in FIG. 4), configured to wake up the DRX packet where the PCell is located by default in response to determining that an indication of DRX packet wake-up is not carried in an RAR message, and the user equipment supports and configures with cross carrier scheduling. The wake-up unit is further configured to wake up the DRX packet where the SCell is located by default in response to determining that an indication of DRX packet wake-up is not carried in an RAR message, and the user equipment does not support or configure with cross carrier scheduling.

In an example, the receiving unit 41, the wake-up unit, etc. may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors or other electronic elements, and may also be implemented in combination with one or more radio frequency (RF) antennas to be configured to execute the aforementioned packet scheduling apparatus.

In the example of the disclosure, the specific manner in which each module and unit performs operations in the packet scheduling apparatus shown in FIG. 4 has been described in detail in the examples of the method, and detailed description will not be given here.

Figure 5:
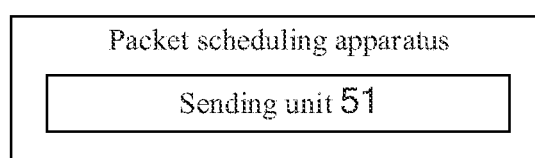
FIG. 5 is a schematic diagram of a composition structure of a packet scheduling apparatus illustrated according to an example.

FIG. 5 is a schematic diagram of a composition structure of a packet scheduling apparatus illustrated according to an example, as shown in FIG. 5, the packet scheduling apparatus of the example of the disclosure includes:

a sending unit 51, configured to send first indication information to user equipment, where the first indication information is configured to indicate a DRX packet which needs to be woken up by the user equipment due to trigger of data transmission.

In one example, the DRX packet which needs to be woken up by the user equipment due to the trigger of the data transmission includes:

a DRX packet which needs to be woken up by the user equipment due to the trigger of the data transmission after receiving a contention-free random access response (RAR) message.

In one example, when the user equipment initiates a random access request of a PCell, the DRX packet includes a DRX packet where the PCell is located.

In one example, when the user equipment initiates a random access request of a primary cell (PCell), the DRX packet includes a DRX packet where an SCell is located.

In one example, when the user equipment initiates a random access request of a primary cell (PCell), the DRX packet includes a DRX packet where the PCell is located, and a DRX packet where an SCell is located.

In one example, when the user equipment initiates a random access request of an SCell, the DRX packet includes a DRX packet where the PCell is located.

In one example, when the user equipment initiates a random access request of an SCell, the DRX packet includes a DRX packet where the secondary cell (SCell) is located.

In one example, when the user equipment initiates a random access request of an SCell, the DRX packet includes a DRX packet where the PCell is located, and a DRX packet where the SCell is located.

In one example, the sending unit 51 is further configured to:

send the first indication information to the user equipment through an RRC signaling, or an MAC control element or a downlink control information (DCI) message.

In one example, the sending unit 51 is further configured to send the RRC signaling to the user equipment through a broadcast channel or a dedicated control channel.

In one example, the sending unit 51 is further configured to:

indicate that the DRX packet where the PCell is located is woken up, or the DRX packet where the SCell is located is woken up, or the DRX packet where the PCell is located and the DRX packet where the SCell is located are both woken up by a newly added bit in the MAC control element.

In one example, the MAC control element includes an RAR message.

In one example, the sending unit is further configured to:

indicate that the DRX packet where the PCell is located is woken up, or the DRX packet where the SCell is located is woken up, or the DRX packet where the PCell is located and the DRX packet where the SCell is located are both woken up by a newly added bit in the DCI message.

In one example, the DCI message includes an msg0 message for random access by the user equipment.

In one example, the sending unit 51 is further configured to:

send second indication information to the user equipment through the RRC signaling, or the MAC control element or the DCI message, where the second indication information is configured to indicate the user equipment to enable a cross carrier scheduling function.

In an example, the sending unit 51 may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors or other electronic elements, and may also be implemented in combination with one or more radio frequency (RF) antennas to be configured to execute the aforementioned user direct connection communication method.

In the example of the disclosure, the specific manner in which each module and unit performs operations in the packet scheduling apparatus shown in FIG. 5 has been described in detail in the examples of the method, and detailed description will not be given here.

Figure 6:
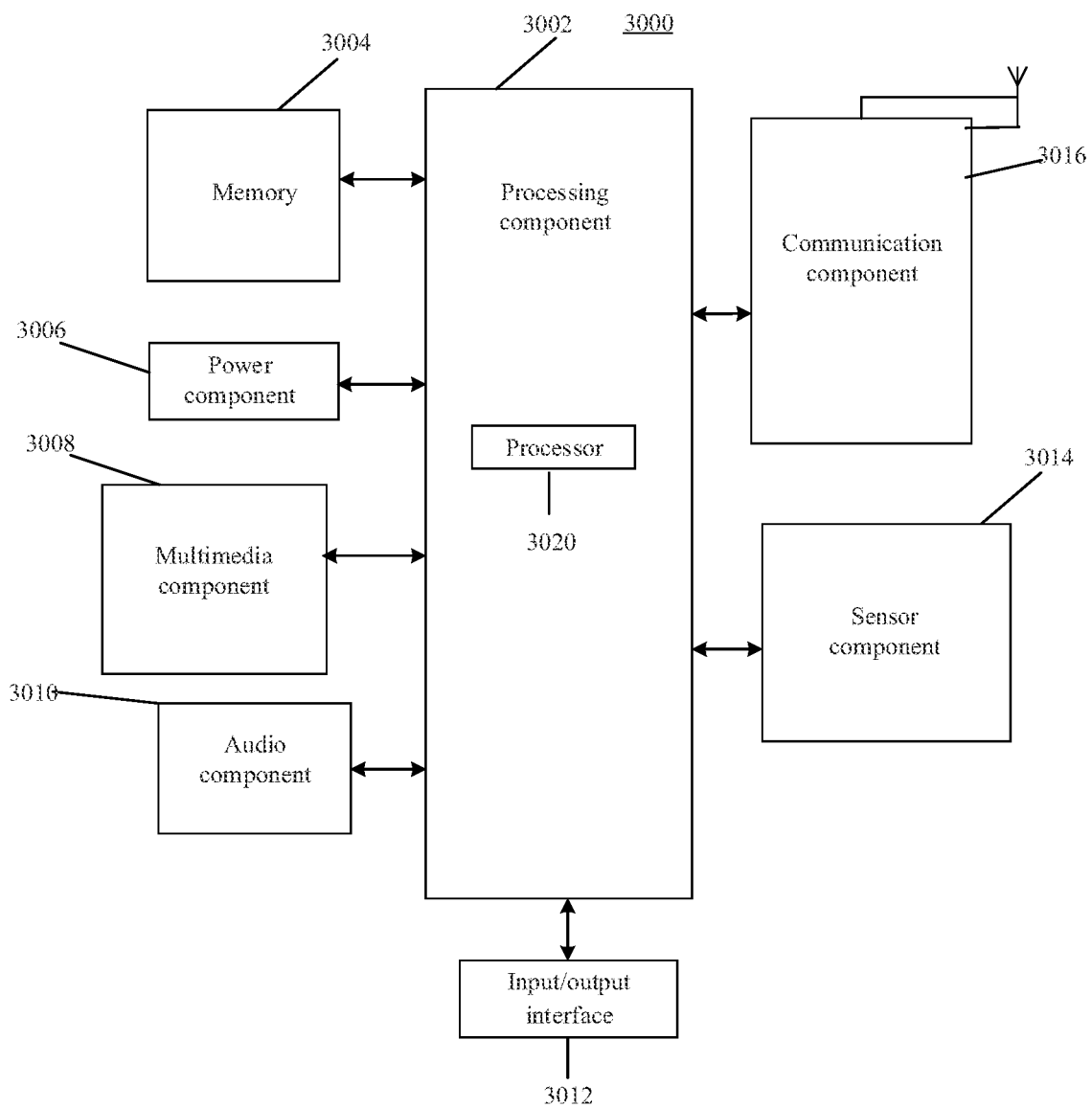
FIG. 6 is a schematic diagram of a composition structure of user equipment illustrated according to an example.

FIG. 6 is a block diagram of user equipment 3000 illustrated according to an example. For instance, the user equipment 3000 may be a mobile phone, a computer, a digital broadcasting terminal, a messaging device, a game console, a tablet device, a medical device, a fitness device, a personal digital assistant, etc.

Referring to FIG. 6, the user equipment 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls the overall operation of the user equipment 3000, such as operations associated with display, a telephone call, data communication, camera operations, and recording operations. The processing component 3002 may include one or more processors 3020 to execute instructions to complete all or part of the steps of the above method. In addition, the processing component 3002 may include one or more modules to facilitate interaction between the processing component 3002 and other components. For instance, the processing component 3002 may include a multimedia module to facilitate interaction between the multimedia component 3008 and the processing component 3002.

The memory 3004 is configured to store various types of data to support operations at the equipment 3000. Instances of these data include instructions for any application or method operating on the user equipment 3000, contact data, phonebook data, messages, pictures, videos, etc. The memory 3004 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk or an optical disk.

The power component 3006 provides power for various components of the user equipment 3000. The power component 3006 may include a power management system, one or more power sources and other components associated with generating, managing and distributing power for the user equipment 3000.

The multimedia component 3008 includes a screen providing an output interface between the user equipment 3000 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding motion, but also detect the duration and pressure related to the touch or sliding operation. In some examples, the multimedia component 3008 includes a front camera and/or a rear camera. When the apparatus 3000 is in an operation mode, such as a shooting mode or a video mode, the front camera and/or the rear camera can receive external multimedia data. Each front camera and rear camera can be a fixed optical lens system or have a focal length and optical zoom capability.

The audio component 3010 is configured to output and/or input audio signals. For instance, the audio component 3010 includes a microphone (MIC) configured to receive an external audio signal when the user equipment 3000 is in the operation mode, such as a call mode, a recording mode, and a speech recognition mode. The received audio signal may be further stored in the memory 3004 or transmitted via the communication component 3016. In some examples, the audio component 3010 further includes a speaker for outputting an audio signal.

The I/O interface 3012 provides an interface between the processing component 3002 and a peripheral interface module which can be a keyboard, a click wheel, a button, etc. These buttons may include but are not limited to: a home button, volume buttons, a start button and a lock button.

The sensor component 3014 includes one or more sensors for providing state evaluation of various aspects of the user equipment 3000. For instance, the sensor component 3014 can detect an on/off state of the equipment 3000 and the relative positioning of the components, for instance, the component is a display and a keypad of the user equipment 3000. The sensor component 3014 can also detect the change of the position of the user equipment 3000 or one component of the user equipment 3000, the presence or absence of user contact with the user equipment 3000, the azimuth or acceleration/deceleration of the user equipment 3000, and temperature change of the user equipment 3000. The sensor component 3014 may include a proximity sensor configured to detect the presence of nearby objects without any physical contact. The sensor component 3014 may further include an optical sensor, such as a CMOS or CCD image sensor, for use in imaging applications. In some examples, the sensor component 3014 may further include an acceleration sensor, a gyroscope sensor, a magnetic sensor, a pressure sensor, or a temperature sensor.

The communication component 3016 is configured to facilitate wired or wireless communication between the user equipment 3000 and other devices. The user equipment 3000 may access a wireless network based on a communication standard, such as Wi-Fi, 2G or 3G, or their combination. In an example, the communication component 3016 receives a broadcast signal or broadcast-related information from an external broadcast management system via a broadcast channel In an example, the communication component 3016 further includes a near field communication (NFC) module to facilitate short-range communication. For instance, the NFC module may be implemented based on a radio frequency identification (RFID) technology, an infrared data association (IrDA) technology, an ultra wideband (UWB) technology, a Bluetooth (BT) technology and other technologies.

In an example, the user equipment 3000 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements to be configured to execute the above packet scheduling method.

In an example, a non-transitory computer-readable storage medium including instructions is further provided, such as the memory 3004 including instructions, which can be executed by the processor 3020 of the user equipment 3000 to complete the above packet scheduling method. For instance, the non-transitory computer-readable storage medium may be an ROM, a random access memory (RAM), a CD-ROM, a magnetic tape, a floppy disk, an optical data storage device, etc.

Other implementations of the examples of the disclosure will be apparent to those skilled in the art from consideration of the specification and practice of the disclosure here. The application is intended to cover any variations, uses, or adaptations of the examples of the disclosure following its general principles and including the common general knowledge or frequently used technical means in the technical field not disclosed in the examples of the disclosure. It is intended that the specification and the examples are considered as examples merely, with a true scope and spirit of the examples of the disclosure being indicated by the following claims.

It is to be understood that the examples of the disclosure are not limited to the exact construction that has been described above and illustrated in the accompanying drawings, and that various modifications and changes may be made without departing from its scope. It is intended that the scope of the examples of the disclosure merely are limited by the appended claims.

The invention claimed is:

1. A packet scheduling method, comprising:
   receiving, by a user equipment, first indication information sent by a network device, wherein the first indication information is configured to indicate a discontinuous reception (DRX) packet which needs to be woken up by the user equipment due to trigger of data transmission; wherein
   when the user equipment initiates a random access request of a primary cell (PCell), the DRX packet comprises one of the following: a DRX packet where the PCell is located; or a DRX packet where a secondary cell (SCell) is located; or the DRX packet where the PCell is located, and the DRX packet where the SCell is located; and
   when the user equipment initiates the random access request of the SCell, the DRX packet comprises one of the following: the DRX packet where the PCell is located; or the DRX packet where the SCell is located; or the DRX packet where the PCell is located, and the DRX packet where the SCell is located.

2. The packet scheduling method according to claim 1, wherein the DRX packet which needs to be woken up by the user equipment due to trigger of data transmission comprises:
   a DRX packet which needs to be woken up by the user equipment due to the trigger of the data transmission after receiving a contention-free random access response (RAR) message.

3. The packet scheduling method according to claim 1, wherein receiving, by the user equipment, the first indication information sent by the network device comprises:
   receiving, by the user equipment, an RRC signaling, or an MAC control element or a downlink control information (DCI) message sent by the network device, wherein the RRC signaling, or the MAC control element, or the DCI message carries the first indication information.

4. The packet scheduling method according to claim 3, wherein the MAC control element carrying the first indication information comprises:
   indicating that the DRX packet where the PCell is located is woken up, or the DRX packet where the SCell is located is woken up, or the DRX packet where the PCell is located and the DRX packet where the SCell is located are both woken up by a newly added bit in the MAC control element.

5. The packet scheduling method according to claim 4, wherein the MAC control element comprises a random access response (RAR) message.

6. The packet scheduling method according to claim 3, wherein the DCI message carrying the first indication information comprises:
   indicating that the DRX packet where the PCell is located is woken up, or the DRX packet where the SCell is located is woken up, or the DRX packet where the PCell is located and the DRX packet where the SCell is located are both woken up by a newly added bit in the DCI message.

7. The packet scheduling method according to claim 3, wherein the RRC signaling, or the MAC control element, or the DCI message further carries second indication information, and the second indication information is configured to indicate the user equipment to enable a cross carrier scheduling function.

8. The packet scheduling method according to claim 3, wherein the user equipment receives the RRC signaling by monitoring a broadcast channel or a dedicated control channel of the network device.

9. The packet scheduling method according to claim 3, wherein the DCI message comprises an msg0 message for random access by the user equipment.

10. The packet scheduling method according to claim 1, further comprising:
    waking up the DRX packet where the PCell is located by default in response to determining that an indication of DRX packet wake-up is not carried in a random access response (RAR) message, and the user equipment supports and configures with cross carrier scheduling.

11. The packet scheduling method according to claim 1, further comprising:
    waking up the DRX packet where the SCell is located by default in response to determining that an indication of DRX packet wake-up is not carried in a random access response (RAR) message, and the user equipment does not support or configure with cross carrier scheduling.

12. A packet scheduling method, comprising:
    sending, by a network device, first indication information to user equipment, wherein the first indication information is configured to indicate a discontinuous reception (DRX) packet which needs to be woken up by the user equipment due to trigger of data transmission; wherein
    when the user equipment initiates a random access request of a primary cell (PCell), the DRX packet comprises one of the following: a DRX packet where the PCell is located; or a DRX packet where a secondary cell (SCell) is located; or the DRX packet where the PCell is located, and the DRX packet where the SCell is located; and
    when the user equipment initiates the random access request of the SCell, the DRX packet comprises one of the following: the DRX packet where the PCell is located; or the DRX packet where the SCell is located; or the DRX packet where the PCell is located, and the DRX packet where the SCell is located.

13. The packet scheduling method according to claim 12, wherein the DRX packet which needs to be woken up by the user equipment due to trigger of data transmission comprises:
   a DRX packet which needs to be woken up by the user equipment due to the trigger of the data transmission after receiving a contention-free random access response (RAR) message.

14. The packet scheduling method according to claim 12, wherein sending, by the network device, the first indication information to the user equipment comprises:
   sending, by the network device, the first indication information to the user equipment through an RRC signaling, or an MAC control element or a downlink control information (DCI) message.

15. The packet scheduling method according to claim 14, wherein sending, by the network device, the first indication information to the user equipment through the MAC control element comprises:
   indicating that the DRX packet where the PCell is located is woken up, or the DRX packet where the SCell is located is woken up, or the DRX packet where the PCell is located and the DRX packet where the SCell is located are both woken up by a newly added bit in the MAC control element.

16. The packet scheduling method according to claim 14, wherein sending, by the network device, the first indication information to the user equipment through the DCI message comprises:
   indicating that the DRX packet where the PCell is located is woken up, or the DRX packet where the SCell is located is woken up, or the DRX packet where the PCell is located and the DRX packet where the SCell is located are both woken up by a newly added bit in the DCI message.

17. The packet scheduling method according to claim 14, further comprising:
   sending, by the network device, second indication information which is configured to indicate the user equipment to enable cross carrier scheduling to the user equipment through the RRC signaling, or the MAC control element or the DCI message.

18. The packet scheduling method according to claim 14, wherein the network device sends the RRC signaling to the user equipment through a broadcast channel or a dedicated control channel.

19. A user equipment, comprising:
   a processor;
   a transceiver; and
   a memory and an executable program stored on the memory and capable of being run by the processor; wherein
   the processor is configured to:
      receive first indication information sent by a network device, wherein the first indication information is configured to indicate a discontinuous reception (DRX) packet which needs to be woken up by the user equipment due to trigger of data transmission; wherein
      when the user equipment initiates a random access request of a primary cell (PCell), the DRX packet comprises one of the following: a DRX packet where the PCell is located; or a DRX packet where a secondary cell (SCell) is located; or the DRX packet where the PCell is located, and the DRX packet where the SCell is located; and
      when the user equipment initiates the random access request of the SCell, the DRX packet comprises one of the following: the DRX packet where the PCell is located; or the DRX packet where the SCell is located; or the DRX packet where the PCell is located, and the DRX packet where the SCell is located.

20. A network device, comprising:
   a processor;
   a transceiver; and
   a memory and an executable program stored on the memory and capable of being run by the processor; wherein
   the processor, when running the executable program, executes the packet scheduling method according to claim 12.

* * * * *